US006157813A

United States Patent [19]

Lewiner et al.

[11] Patent Number: 6,157,813

[45] Date of Patent: Dec. 5, 2000

[54] PORTABLE ONE-WAY RADIO PAGER AND A METHOD OF TRANSMITTING MESSAGES THERETO

[76] Inventors: Jacques Lewiner, 7 Avenue de Suresnes, 92210 Saint Cloud; Eric Carreel, 9 Rue du General Gouraud, 92190 Meudon, both of France

[21] Appl. No.: 09/038,460

[22] Filed: Mar. 11, 1998

[30] Foreign Application Priority Data

Mar. 11, 1997 [FR] France .................................. 97 02856

[51] Int. Cl.[7] ........................................ H04Q 7/00

[52] U.S. Cl. .................. 455/31.1; 455/31.2; 340/825.44

[58] Field of Search ......................... 340/825.44, 825.31, 340/825.35, 825.36, 539; 455/31.1, 228, 31.2, 405, 406, 407; 379/114

[56] References Cited

U.S. PATENT DOCUMENTS

| | | | |
|---|---|---|---|
| 5,049,874 | 9/1991 | Ishida et al. | 340/825.44 |
| 5,138,650 | 8/1992 | Stahl et al. | 455/408 |
| 5,359,182 | 10/1994 | Schilling | 235/380 |
| 5,371,493 | 12/1994 | Sharpe et al. | 340/825.44 |
| 5,376,931 | 12/1994 | Marrs | 340/825.44 |
| 5,610,973 | 3/1997 | Comer | 455/413 |
| 5,870,030 | 2/1999 | SeLuca et al. | 340/825.44 |
| 5,983,094 | 11/1999 | Altschul et al. | 455/413 |
| 6,044,258 | 3/2000 | Abdella | 455/405 |
| 6,070,067 | 5/2000 | Ngyen et al. | 455/407 |

FOREIGN PATENT DOCUMENTS

| | | |
|---|---|---|
| 0 360 228 | 3/1990 | European Pat. Off. . |
| 0 538 933 | 4/1993 | European Pat. Off. . |
| 2 263 568 | 7/1993 | United Kingdom . |

OTHER PUBLICATIONS

French Search Report dated Oct. 28, 1997, French Patent Appl No. 97 02856.

Patent abstract of Japan, vol. 012, No. 403, (E–674), Oct. 2, 1988.

*Primary Examiner*—Dwayne D. Bost
*Assistant Examiner*—Sonny Trinh
*Attorney, Agent, or Firm*—Marshall, O'Toole, Gerstein, Murray & Borun

[57] ABSTRACT

A portable one-way radio pager includes receiver means for receiving coded radio messages, a CPU for processing the messages, and a control memory containing at least one number referred to as "validity data" representative of a certain sum of money, the CPU being designed to decrement the validity data progressively during operation of the pager and to prevent normal operation of the pager when said validity data is less than a predetermined minimum value.

10 Claims, 1 Drawing Sheet

FIG.1.
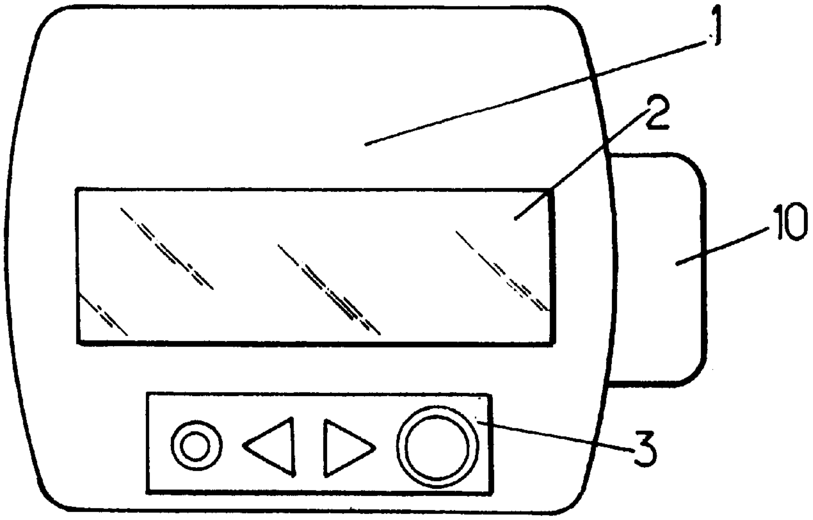
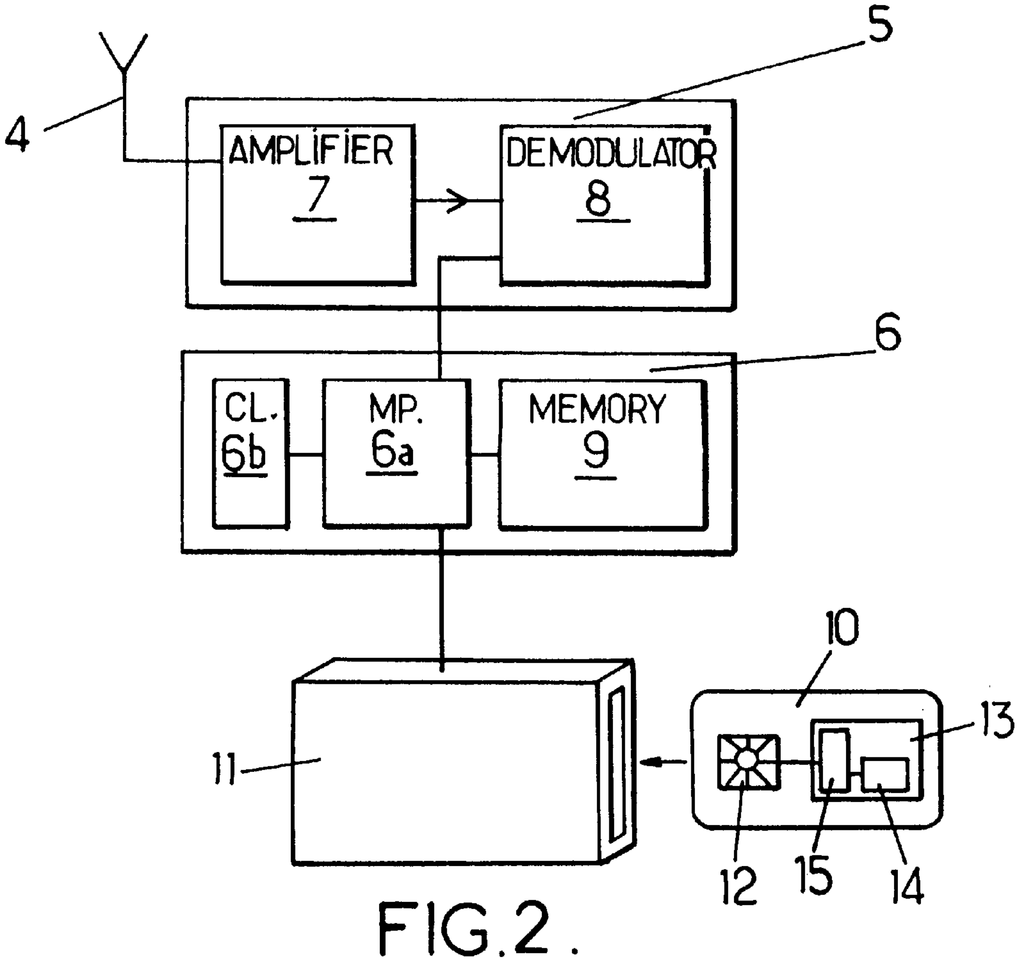
FIG.2.

PORTABLE ONE-WAY RADIO PAGER AND A METHOD OF TRANSMITTING MESSAGES THERETO

FIELD OF THE INVENTION

The present invention relates to portable one-way radio pagers adapted solely to receive radio messages, without any possibility of transmitting.

Such a pager comprises at least:

receiver means for receiving radio messages;

memory means for storing the received messages;

an electronic CPU for processing the messages; and interface means communicating with the CPU to enable the pager to be used.

BACKGROUND OF THE INVENTION

In certain existing systems, it is the senders of radio messages who pay fees to the operator of the radio paging network in order to have messages transmitted to the portable pagers.

Payment on that basis restrains use of radio pager systems, since in many cases potential senders of radio messages decide not to send a message in order to avoid paying a fee to the network operator, even when the bearer of the pager would generally like to receive the message, and would probably be willing to pay said fee for that purpose.

In other existing systems, subscriptions are paid on behalf of radio pagers to enable them to receive either all radio messages addressed to them, or else certain specific information such as financial or sports information, for example.

The information received by the receiver can then be consulted by the user so long as the subscription period has not expired.

Nevertheless, that payment system requires users to pay a fixed subscription, even for periods during which they make little or no use of the facilities that give them access to the received information.

In an attempt to avoid the above drawbacks, document GB-2 263 568 proposes a one-way radio pager comprising:

receiver means for receiving radio messages;

memory means for storing the messages received;

an electronic CPU for processing the messages;

interface means communicating with the CPU to enable the pager to be used; and a control memory containing at least one number, referred to as "validity data", representative of a certain sum of money;

the CPU being designed:

to decrement the validity data progressively each time said CPU performs certain predetermined "chargeable operations", each chargeable operation corresponding to a certain numerical value which is referred to as the "price" of the chargeable operation and which is determined as a function of a certain tariff, the validity data being decremented on each occasion that the CPU performs a chargeable operation by subtracting the price of the chargeable operation from the validity data; and to prevent normal operation of the pager when said validity data is below a predetermined minimum value.

The user of such a pager must begin by "crediting" the validity data of the radio pager by purchasing in advance a certain number of units representing a certain sum of money, with this initial credit being diminished little by little as a function of the way in which the pager is used, said use subsequently being barred once the units have been consumed.

That method of operation nevertheless suffers from lack of flexibility insofar as:

operation of the pager is completely barred for all incoming messages once the credit of units contained in the control memory has been spent; and the tariff is identical for all of the received messages, even though the radio pager network operator may desire that messages corresponding to certain specific services be more expensive than other messages, or indeed may desire to have certain types of message charged to the sender of the message rather than by the person receiving it, or indeed to give access to certain messages via a subscription rather than by debiting the validity data.

OBJECTS AND SUMMARY OF THE INVENTION

A particular object of the present invention is to mitigate those drawbacks.

To this end, according to the invention, in a portable radio pager of the kind in question, the radio messages received by the pager belong to a plurality of different categories, and the CPU is adapted to recognize the category of each message and, during each operation of decrementing the validity data, to apply different tariffs depending on message category.

By means of these dispositions, it is possible to apply different tariffs to received radio messages depending on the categories of the messages (e.g. personal messages, general information messages relating to sports information, to stock exchange or financial information, etc.).

More particularly, the invention makes it possible, where appropriate, to provide one or more categories of free messages, i.e. messages for which the price is equal to zero. Such messages can thus be received by the pager and consulted by the user, even when the validity data is below its predetermined minimum value.

By way of example, free message categories may comprise: urgent information messages and/or messages issued by public authorities (e.g. pollution warnings, dangerous weather conditions, etc.); information messages relating to the pager network itself; advertising messages; or indeed messages explaining to the user how to put new credit into the control memory of the pager when the validity data is below its predetermined minimum value.

In preferred embodiments of the invention, use may optionally be made to one or more of the following dispositions:

the pager constitutes a closed unit containing the control memory, said pager further including means for reloading said control memory in order to increase the validity data contained in said memory;

the means for reloading the control memory comprise said receiver means, the CPU being designed to recognize certain predetermined radio messages for reloading the control memory, and to reload said control memory as a function of said messages;

the means for reloading the control memory comprise a card reader enabling two-way communication to be established between the CPU and a portable card having an integrated memory circuit in which a positive number n1 is stored, the CPU being designed to transfer at least part of said number n1 from the card to the control memory, thereby increasing the validity data contained in said control memory by a number n2 and decreasing the number n1 stored in the card by the same number n2, n2 being a positive number not greater than n1;

the pager comprises:

firstly a portable pager unit including the receiver means, the memory means, the electronic CPU, the interface means, and a card reader; and secondly, a portable card which has an integrated circuit provided with a memory and which is received in the card reader, which card reader enables two-way communication to be established between the card and the CPU, with the memory of the card constituting said control memory;

the memory means include a "tariff table" enabling the price of each chargeable operation to be determined as a function of the category of each radio message;

the price corresponding to at least one category of messages is zero, and the price of at least one other category of messages is non-zero;

the CPU is adapted to recognize certain predetermined radio messages carrying new data for inclusion in the tariff table, and to update said tariff table as a function of said messages;

the CPU is designed to recognize certain predetermined portions of messages belonging to at least certain received radio messages which correspond to chargeable operations, said predetermined message portions containing the prices of the corresponding chargeable operations;

the chargeable operations comprise displaying on the screen at least certain information corresponding to received radio messages, the CPU being designed to prevent said information being displayed when the validity data is less than said predetermined minimum value; and the chargeable operations comprise storing at least certain received radio messages, the CPU being designed to prevent said messages being stored when the validity data is less than said predetermined minimum value.

In addition, the invention also provides a portable pager unit for a pager as defined above, said portable unit comprising the receiver means, the memory means, the electronic CPU, the interface means, and the card reader.

Finally, the invention also provides a method of transmitting messages to a radio pager as defined above, in which, each time the CPU performs a chargeable operation, the validity data is decremented by a value equal to the price of the chargeable operation, said price being equal to zero for chargeable operations relating to messages belonging to at least one message category, and said price being non-zero for chargeable operations relating to messages of at least one other message category.

In preferred implementations of the method of the invention, use may optionally be made of one or more of the following dispositions:

the messages corresponding to a zero price comprise at least information messages relating to purchasing new units corresponding to the validity data, said messages being addressed to a particular radio pager and including an identity code specific to the pager, and said messages being broadcast by the radio pager network when a certain condition is satisfied making it likely that the validity data contained in the control memory of the pager is less than a predetermined value;

the operator of the radio pager network identifies each user on purchase of units corresponding to the validity data, with the message relating to purchasing new units corresponding to the validity data being broadcast to each user a certain predetermined length of time after the latest purchase of units by said user; and the operator of the radio pager network identifies each user on purchase of units corresponding to the validity data, with the message relating to purchasing new units being broadcast as a function of the radio messages concerning the user that have been broadcast by the pager network since the latest purchase of units by said user and as a function of the tariffs applied to the various messages.

BRIEF DESCRIPTION OF THE DRAWINGS

Other characteristics and advantages of the invention appear from the following description of an implementation thereof given by way of non-limiting example and with reference to the accompanying drawing.

In the drawing:

FIG. 1 is a diagrammatic view of a one-way radio pager constituting an embodiment of the invention; and FIG. 2 is a block diagram of the FIG. 1 pager.

MORE DETAILED DESCRIPTION

FIG. 1 shows a one-way radio pager comprising firstly a portable pager unit 1 and secondly a memory card 10 having coded access and designed to be inserted in the unit.

The unit 1 is capable of receiving coded messages by radio, e.g. in application of European "ERMES" standard (EEC Directives 85/734 and 92/59), for example.

The unit has a screen 2 for displaying messages, and a keypad 3 serving in particular to scroll messages on the screen, to erase the memory means 9, etc.

Optionally, the unit 1 may include other interfaces (loudspeaker, electrical or optical connection with another device, etc.) enabling it to communicate externally, in addition to the screen and/or the keypad, or as a replacement therefor.

As shown diagrammatically in FIG. 2, the unit 1 includes an antenna 4 connected to a receiver circuit 5 itself connected to a CPU 6 which may be constituted, in particular, by a microprocessor or a microcontroller **6*a* (MP), itself connected to a clock 6*b* (CL) and to a memory 9**.

The receiver circuit 5 includes an amplifier 7 which amplifies signals from the antenna 4, and a demodulator 8 which receives the amplified signals from the amplifier 7, and which forwards the signals after demodulation to an analog input of the CPU 6.

In addition, the CPU 6 is connected to a memory card reader 11 which is adapted to receive the memory card 10 and to enable the CPU to read and write in the memory of the card.

The memory card 10 comprises:

an interface 12 such as a set of electrically conductive areas adapted to be connected to electrical contacts inside the reader 11 (it should nevertheless be observed that these electrically conductive areas could be replaced by any other interface enabling two-way communication to be performed with the reader 11, e.g. an inductive or a capacitive interface); and an integrated circuit 13 connected to the interface 12, said integrated circuit including at least one coded access memory 14, and generally including a microprocessor 15 interposed between the memory 14 and the interface 12.

The integrated circuit 13 may optionally contain only the memory 14, in which case access would be direct.

When the user of the unit 1 initially purchases the card 10, or when the user causes the card 10 to be reloaded by paying a certain sum of money, the memory 14, referred to as a "control memory", contains a positive number n (generally an integer) that is representative of the sum the user pays to purchase the card 10 or to reload it.

Naturally, under some circumstances the card or the number n of units may be given, in part or in full to the user, e.g. during a promotion. However in all circumstances the number n remains representative of a certain sum of money, where appropriate corresponding to the value of the gift that may have been given to a user.

The n units enable the user of the portable pager to perform a certain number of operations with the pager in application of the tariff specified by the network operator.

By way of example, the tariff may be contained in the memory 9 of the CPU 6 in the form of a tariff table identifying which of the various operations that the user can perform using the portable pager 1 are operations that are chargeable, and also giving the number of units corresponding to each type of operation, i.e. the price of each chargeable operation, for each category of radio message.

By way of example, the radio messages may be grouped into three categories that can be distinguished from one another by the presence of certain predetermined data fields in said messages:

- personal messages, containing an identification code specific to the radio pager and addressed solely to the user of that pager;
- general information messages relating to sports information;
- general information messages relating to stock exchange and monetary information;
- priority general information messages (urgent information and/or information issued by public authorities, such as pollution warnings or dangerous weather warnings);
- general information messages concerning the operation of the pager network; and
- advertising messages.

By way of example, the tariff table contained in the memory 9 may specify:

- that displaying a personal message on the screen 2 costs two units;
- that displaying a message in the sports or stock exchange and monetary categories for general information costs one unit; and
- that messages belonging to the following categories are displayed for free: priority messages; general information messages concerning operation of the pager network; and advertising messages.

The tariff table can be updated from time to time by the network operator by sending special radio messages which are recognized by the CPU 6.

In the example under consideration, the pager operates as follows:

- all radio messages are processed by the CPU 6 as soon as they are received, personal messages being stored unchanged in the memory 9 and general messages also being stored in said memory 9, possibly after the data contained in said general messages has been processed;
- if the user seeks to display a personal message, the CPU 6 verifies that the card 10 is indeed present in the reader 11, and that the number n of units contained in the control memory 14 is not less than two, otherwise it refuses to display the personal message and instead displays the message on the screen 2 to indicate that the number of units contained in the card 10 is insufficient; and
- if the number n of units is at least two, then the CPU 6 displays the personal message on the screen 2, while simultaneously decrementing the number n contained in the control memory 14 of the card 10 by two units.

Operation is the same when the user seeks to display a general information message on the screen 2 such as sporting or stock market information, with the exception that the CPU 6 initially verifies that the number n of units contained in the control memory 14 is at least one, said number n then being decremented by one unit when the desired information is displayed.

Finally, for priority general messages, general information messages concerning the operation of the pager network, and advertising messages, display on the screen 2 is always possible, even when the number n of units is down to zero.

Amongst the free general information messages concerning pager network operation, it is possible to include messages that are specifically addressed to a particular pager, i.e. messages including the identification code of the pager, when it is certain or probable that the pager in question has already consumed all of its credit of units loaded into its control memory 14.

It can be envisaged that such a message will be sent to a pager particularly when the pager network operator can identify users as they purchase new credit units, with information messages concerning how to purchase new units then being sent out either when a predetermined length of time has elapsed since the last purchase of units, or else when the user is assumed to have consumed the previous credit of units, as a function of the general and personal messages relating to the user that have been broadcast by the pager network since the last time the user in question purchased units.

Naturally, it is possible to provide for payment to be made only on first display of a message, with subsequent re-displays of the same message being performed without decrementing the number n of units contained in the control memory 14.

It would also be possible to organize the system so that the operations that are paid for are not operations of consulting received messages but operations of storing said messages in the memory 9, in which case the number n of units contained in the control memory 14 is decremented as the messages arrive, and the messages are no longer stored in the memory once the number n contained in the control memory has become insufficient.

Also, instead of integrating a tariff table in the memory 9 of the CPU 6, each message received by the pager unit 1 and corresponding to chargeable information could contain a special field that is recognizable by the CPU 6 and that specifies the price of a chargeable operation corresponding to the message (e.g. display or storage), the price being given as a number of units.

It would also be possible to store the number n of units that have been purchased in advance by the user in the memory 9 of the CPU 6, so as to make it unnecessary to have a memory card 10 permanently plugged into the reader 11.

Under such circumstances, and assuming that the memory 9 contains a number n0 of units and that a memory card is plugged into the reader 11 having a memory 14 containing a number n1 of units, the CPU 6 adds n1 to the number of units already contained in its memory 9, thus giving n0+n1, and said CPU 6 simultaneously zeros the number of units contained in the memory 14 of the card 10 (it would also be possible to transfer a number n2<n1 of units from the card to the memory 9 so that the card then still retains n1−n2 units in its memory).

Thereafter, the memory card 10 can be removed from the reader 11, with the portable pager unit 1 then operating independently and progressively decrementing the number of units contained in its own memory 9 as it is used.

Finally, when the memory 9 is used as the control memory and contains the number of units purchased in advance by the user, it is also possible to reload this control memory by means of a special radio message that is recognizable by the CPU 6: under such circumstances, the user can purchase a certain number of units from the pager network operator and the network operator can then send a radio message specifying firstly the identity of the portable pager unit 1 whose memory 9 is to receive credit corresponding to a certain number of units, and secondly the number of units that are to be credited to the memory 9 of said pager unit 1.

Under such circumstances, the portable pager unit 1 need not necessarily have a card reader 11.

We claim:

1. A portable one-way radio pager, comprising:

receiver means for receiving radio messages;

memory means for storing the messages received; an electronic CPU for processing the messages;

interface means communicating with the CPU to enable the pager to be used; and a control memory containing at least one number, referred to as "validity data", representative of a certain sum of money;

the CPU being designed:

to decrement the validity data progressively each time said CPU performs certain predetermined "chargeable operations", each chargeable operation corresponding to a certain numerical value referred to as the "price" of the chargeable operation and which is determined as a function of a certain tariff, the validity data being decremented on each occasion the CPU performs a chargeable operation by subtracting the price of the chargeable operation from the validity data; and to prevent normal operation of the pager when said validity data is less than a predetermined minimum value;

wherein the radio messages received by the pager belong to a plurality of different categories, and wherein the CPU is adapted to recognize the category of each message, during each operation of decrementing the validity data, and to apply different tariffs depending on message category; and in which the CPU is designed to recognize certain predetermined portions of messages belonging to at least certain received radio messages which correspond to chargeable operations, said predetermined message portions containing the prices of the corresponding chargeable operations.

2. A pager according to claim 1, constituting a closed unit containing the control memory, said pager further including means for reloading said control memory in order to increase the validity data contained in said memory.

3. A pager according to claim 2, in which the means for reloading the control memory comprise said receiver means, the CPU being designed to recognize certain predetermined radio messages for reloading the control memory, and to reload said control memory as a function of said messages.

4. A pager according to claim 2, in which the means for reloading the control memory comprise a card reader enabling two-way communication to be established between the CPU and a portable card having an integrated memory circuit in which a positive number n1 is stored, the CPU being designed to transfer at least part of said number n1 from the card to the control memory, thereby increasing the validity data contained in said control memory by a number n2 and decreasing the number n1 stored in the card by the same number n2, n2 being a positive number not greater than n1.

5. A pager according to claim 1, comprising:

firstly a portable pager unit including the receiver means, the memory means, the electronic CPU, the interface means, and a card reader; and secondly, a portable card which has an integrated circuit provided with a memory and which is received in the card reader, which card reader enables two-way communication to be established between the card and the CPU, with the memory of the card constituting said control memory.

6. A pager according to claim 1, in which the chargeable operations comprise displaying on the screen at least certain information corresponding to received radio messages, the CPU being designed to prevent said information being displayed when the validity data is less than said predetermined minimum value.

7. A pager according to claim 1, in which the chargeable operations comprise storing at least certain received radio messages, the CPU being designed to prevent said messages being stored when the validity data is less than said predetermined minimum value.

8. A method of transmitting one-way radio pager messages to a portable one-way radio pager, wherein the pager includes:

receiver means for receiving radio messages;

memory means for storing the messages received;

an electronic CPU for processing the messages;

interface means communicating with the CPU to enable the pager to be used; and a control memory containing at least one number, referred to as "validity data", representative of a certain sum of money;

the CPU being designed:

to decrement the validity data progressively each time said CPU performs certain predetermined "chargeable operations", each chargeable operation corresponding to a certain numerical value referred to as the "price" of the chargeable operation and which is determined as a function of a certain tariff, the validity data being decremented on each occasion the CPU performs a chargeable operation by subtracting the price of the chargeable operation from the validity data; and to prevent normal operation of the pager when said validity data is less than a predetermined minimum value;

wherein the radio messages received by the pager belong to a plurality of different categories, and wherein the CPU is adapted to recognize the category of each message, during each operation of decrementing the validity data, and to apply different tariffs depending on message category;

in which, each time the CPU performs a chargeable operation, the validity data is decremented by a value equal to the price of the chargeable operation, said price being equal to zero for chargeable operations relating to messages belonging to at least one message category, and said price being non-zero for chargeable operations relating to messages of at least one other message category in which the messages corresponding to a zero price comprise at least information messages relating to purchasing new units corresponding to the validity data, said messages being addressed to a particular radio pager and including an identity code specific to the pager, and said messages being broadcast by the radio pager network when a certain condition is satisfied making it likely that the validity data contained in the control memory of the pager is less than predetermined value; and in which the operator of the radio pager network identifies each user on purchase of units corresponding to the validity data, with the message relating to purchasing new units being broadcast as a function of the radio messages concerning the user that have been broadcast by the pager network since the latest purchase of units by said user and as a function of the tariffs applied to the various messages.

9. A portable one-way radio pager, comprising:

receiver means for receiving radio messages;

memory means for storing the messages received; an electronic CPU for processing the messages;

interface means communicating with the CPU to enable the pager to be used; and a control memory containing at least one number, referred to as "validity data", representative of a certain sum of money;

the CPU being designed:

to decrement the validity data progressively each time said CPU performs certain predetermined "chargeable operations", each chargeable operation corresponding to a certain numerical value referred to as the "price" of the chargeable operation and which is determined as a function of a certain tariff, the validity data being decremented on each occasion the CPU performs a chargeable operation by subtracting the price of the chargeable operation from the validity data; and to prevent normal operation of the pager when said validity data is less than a predetermined minimum value;

wherein the radio messages received by the pager belong to a plurality of different categories, and wherein the CPU is adapted to recognize the category of each message, during each operation of decrementing the validity data, and to apply different tariffs depending on message category; and wherein the memory means include a "tariff table" which contains:

message categories, and for each message category at least a price for chargeable operations, the CPU being adapted to recognize certain predetermined radio messages carrying new data for inclusion in the tariff table, and to update said tariff table as a function of said messages.

10. A pager according to claim 9, in which the price corresponding to at least one category of messages is zero, and the price of at least one other category of messages is non-zero.

* * * * *